United States Patent [19]

Sasaki et al.

[11] Patent Number: 4,946,819

[45] Date of Patent: Aug. 7, 1990

[54] PHOSPHORUS-ANTIMONY-CONTAINING CATALYST FOR OXIDATION

[75] Inventors: Yutaka Sasaki; Hiroshi Utsumi; Masato Otani; Shinji Yamamoto, all of Kanagawa, Japan

[73] Assignee: Nitto Chemical Industry Co., Ltd., Tokyo, Japan

[21] Appl. No.: 276,586

[22] Filed: Nov. 28, 1988

[30] Foreign Application Priority Data

Nov. 27, 1987 [JP] Japan ................. 62-300995

[51] Int. Cl.$^5$ ............... B01J 27/182; B01J 27/186
[52] U.S. Cl. ......................... 502/214; 502/249
[58] Field of Search ............... 502/249, 214

[56] References Cited

U.S. PATENT DOCUMENTS

| | | | |
|---|---|---|---|
| 3,186,955 | 6/1965 | Callahan et al. | 502/249 |
| 3,213,034 | 10/1965 | Drehman | 502/214 |
| 3,415,886 | 12/1968 | McClellan | 502/249 |
| 3,657,155 | 4/1972 | Yoshino et al. | 502/249 |
| 4,306,090 | 12/1981 | Kirch et al. | 568/481 |
| 4,347,163 | 8/1982 | Shaw et al. | 252/435 |
| 4,558,029 | 12/1985 | Paparizos et al. | 502/211 |
| 4,590,173 | 5/1986 | Sasaki et al. | 502/249 |

FOREIGN PATENT DOCUMENTS 0088328 9/1983 European Pat. Off. .
0124706 11/1984 European Pat. Off. .

*Primary Examiner*—Carl F. Dees
*Attorney, Agent, or Firm*—Sughrue, Mion, Zinn, Macpeak & Seas

[57] ABSTRACT

A phosphorus-antimony-containing catalyst for oxidation, which is obtained by calcining a metal oxide composition containing as essential components, (a) antimony, (b) at least one element selected from the group consisting of iron, cobalt, nickel, tin, uranium, chromium, copper, manganese, titanium, thorium, and cerium, and (c) silica, at a temperature ranging from 500° C. to 950° C. to prepare a base catalyst, impregnating the base catalyst with a solution containing a phosphorus compound so that the atomic ratio of impregnated phosphorus to antimony the base catalyst is within the range of from 0.01:1 to 2:1, drying the impregnated base catalyst, and calcining the dried product at a temperature ranging from 300° C. to 850° C. The catalyst exhibits satisfactory activity and strength and can be prepared with satisfactory reproducibility.

7 Claims, No Drawings

PHOSPHORUS-ANTIMONY-CONTAINING CATALYST FOR OXIDATION

FIELD OF THE INVENTION

This invention relates to a phosphorus-antimony-containing catalyst suitable for the oxidation of organic compounds. The oxidation of organic compounds to which the catalyst of this invention is applicable includes ordinary oxidation reactions as well as oxidation reactions accompanied by dehydrogenation, i.e., oxidative dehydrogenation, and ammoxidation.

BACKGROUND OF THE INVENTION

Phosphorus-containing metal oxide catalysts are used in various reactions, such as oxidation, oxidative dehydrogenation or ammoxidation of organic compounds, and dehydration, hydration or dehydrogenation of organic compounds. In some of these catalyst systems, a phosphorus component is present in a relatively small proportion to act like a promoter, and in others it is present in a major proportion in the form of a solid phosphoric acid or a phosphate.

Examples of the use of phosphorus-containing metal oxide catalysts include production of acrolein by oxidation of propylene (JP-B-36-3563) (the term "JP-B" as used herein means "an examined Japanese patent publication"), production of methacrolein by oxidation of isobutylene (JP B-41-20693), production of acrylonitrile by ammoxidation of propylene (JP-B-38-19111 and JP-B-38-14717), production of hydrogen cyanide by ammoxidation of methanol (JP-B-54-39839), production of alkenylbenzenes by oxidative dehydrogenation of alkylbenzenes (JP-B-49-41182 and 52-29299), and production of methacrylic acid by oxidative dehydrogenation of isobutyric acid (JP-A-57-134442) (the term "JP-A" as used herein means an "unexamined published Japanese patent application").

Catalysts used in the above-stated reactions comprise a carrier having supported thereon phosphorus either alone or in combination with other elements. However, they do not always have satisfactory activity and strength. Moreover, preparation of these catalysts involves the problem of poor reproducibility since many of the phosphorus compounds used are easily vaporized due to their relatively high vapor pressure and also they have great effects on accelerating sintering during calcination.

On the other hand, in the preparation of catalyst systems having a high phosphorus content as in the catalyst of the present invention, satisfactory results are not achieved with direct application of conventional processes proposed for preparing antimony-containing catalysts. For instance, the processes disclosed in JP-B-47-18722 (corresponding to U.S. Patent 3,657,155) and JP-B-47-18723 (corresponding to U.S. Pat. No. 3,686,138) are excellent techniques for preparing antimony-containing catalysts suitable for fluidized bed reactions. However, it is difficult to use these processes to produce catalysts containing a relatively large amount of phosphorus while retaining activity and strength sufficient for use in fluidized bed reactions. This is assumed to be because the presence of a large amount of a phosphorus component not only inhibits oxidation of antimony but greatly changes the properties of the slurry which is involved in the processes, thereby reducing its stability.

SUMMARY OF THE INVENTION

One object of this invention is to provide a phosphorus-antimony-containing catalyst for oxidation (inclusive of general oxidation reactions, oxidative dehydrogenation, and ammoxidation) which exhibits satisfactory catalytic activity and strength.

Another object of this invention is to provide a phosphorus-antimony-containing catalyst for oxidation, which can be prepared with satisfactory reproducibility.

A further object of this invention is to provide a process for producing acrylonitrile, hydrogen cyanide or styrene by an oxidation reaction in the presence of the above-described catalyst.

That is, the present invention provides a phosphorus-antimony-containing catalyst for oxidation, which is obtained by calcining a metal oxide composition containing, as essential components,
 (a) antimony,
 (b) at least one element selected from the group consisting of iron, cobalt, nickel, tin, uranium, chromium, copper, manganese, titanium, thorium, and cerium, and
 (c) silica at a temperature ranging from 500° C. to 950° C. to prepare a base catalyst, impregnating the base catalyst with an impregnating solution containing a phosphorus compound so that the atomic ratio of impregnated phosphorus to antimony in the base catalyst is within the range of from 0.01:1 to 2:1, drying the impregnated base catalyst, and calcining the dried product at a temperature ranging from 300° C. to 850° C.

DETAILED DESCRIPTION OF THE INVENTION

The phosphorus-antimony-containing catalyst according to the present invention can be produced by the process as described below.

First of all, a base catalyst comprising the above-described essential components (a), (b), and (c) is prepared. This can be done by referring to JP-B-42-22476 and JP-B-47-18722 (corresponding to U.S. Pat. No. 3,657,155) and JP-B-47-18723 (corresponding to U.S. Pat. No. 3,686,138).

For particular use in fluidized bed reactions, the base catalyst is preferably formed by preparing a slurry containing (a) an antimony compound, (b) a compound of at least one element selected from the group consisting iron, cobalt, nickel, tin, uranium, chromium, copper, manganese, titanium, thorium, and cerium, and (c) silica sol, adjusting the pH of the slurry to 7 or less, heat treating the slurry at a temperature from about 40° C. to about 150° C., spray-drying the slurry, and then calcining it at 500° C. to 950° C.

The base catalyst preferably has a composition represented by the empirical formula:

$$Me_aSb_bX_cQ_dR_eS_fO_g(SiO_2)_h$$

wherein Me represents at least one element selected from the group consisting of Fe, Co, Ni, Sn, U, Cr, Cu, Mn, Ti, Th, and Ce, preferably at least one element selected from the group consisting of Fe, Co, Ni Sn, Cr, Cu Mn, Ti, and Ce; X represents at least one element selected from the group consisting of V, Mo, and W; Q represents at least one element selected from the group consisting of Be, Mg, Ca, Sr, Ba, Y, La, Zr, Hf, Nb, Ta, Re, Ru, Os, Rh, Ir, Pd, Pt, Ag, Zn, Cd, Al, Ga, In, Ge, and Pb, preferably at least one element selected from the group consisting of Mg, Zr, Nb, Ta, Ag, Zn, Al, and Pb; R represents at least one element selected from the group consisting of B, P, Te, Bi, As, and Se, preferably at least one element selected from the group consisting of B, P, Te, and Bi; S represents at least one element selected from Li, Na, K, Rb, Cs, and Tl, preferably at least one element selected from the group consisting of Li, Na, and K; O represents an oxygen atom; and a, b, c, d, e, f, g, and h each represents the atomic ratio of the respective element for which each is a subscript, wherein a is from 5 to 15; b is from 5 to 100, preferably from 10 to 50; c is from 0 to 15, preferably from 0.01 to 10; d is from 0 to 20, preferably from 0.05 to 15; e is from 0 to 10, preferably from 0.1 to 7; f is from 0 to 5, preferably from 0.05 to 3; h is from 10 to 200, preferably from 20 to 150; and g is the number of oxygens corresponding to the oxides formed by each of the components described above; provided that the P/Sb atomic ratio is 0.2:1 or less.

The thus prepared base catalyst is then impregnated with a solution of a phosphorus compound.

The phosphorus compound which can be used in the impregnating solution can be selected from water-soluble phosphorus compounds, such as orthophosphoric acid, orthophosphates, pyrophosphoric acid, pyrophosphates, tripolyphosphoric acid, tripolyphosphates, metaphosphoric acid, metaphosphates, peroxomono- or diphosphoric acid, peroxophosphates, phosphorous acid, and phosphites.

The impregnating solution may further contain one or more of other elements other than phosphorus, which are selected from Fe, Co, Ni, Sn, U, Cr, Cu, Mn, Ti, Th, Ce, V, Mo, W, Be, Mg, Ca, Sr, Ba, Y, La, Zr, Hf, Nb, Ta, Re, Ru, Os, Rh, Ir, Pd, Pt, Ag, Zn, Cd, Al, Ga, In, Ge, Pb, B, Te, Bi, As, Se, Li, Na, K, Rb, Cs, B, and Bi (hereinafter referred to as T). In such a case, the other elements are used in the form of their water-soluble compounds. For example, in case of using iron, cobalt, nickel, chromium, copper, manganese, cerium, lanthanum, zirconium, magnesium, calcium, strontium, barium, silver, zinc, cadmium, aluminum, gallium, or lead preferably the nitrate is used. Salts of organic acids are also employable. In case of using lithium, sodium, potassium, rubidium or cesium, each is preferably used in the form of its hydroxide or nitrate. In case of using boron, it can be used in the form of boric acid, whose solubility in an aqueous solution may be increased by using glycerin, propylene glycol, tartaric acid, lactic acid, malic acid, etc. In case of using vanadium, molybdenum or tungsten, it is advantageously used as a water-soluble compound, such as a salt of an oxyacid thereof. Phosphorus is preferably used as phosphoric acid, a phosphate, etc. Tellurium is preferably used as tellurium dioxide, tellurous acid, telluric acid, tellurium nitrite, etc. Bismuth is preferably used as the nitrate.

The above-described compounds are dissolved in water individually or all together to prepare an impregnating solution containing phosphorus alone, or, if desired, an impregnating solution containing other element(s) or both phosphorus and other element(s).

The amount of the impregnating solution which is used for impregnation is selected so as to meet the previously measured pore volume of the base catalyst. The pore volume is measured by liquid wetting methods, mercury intrusion methods, chemisorption methods and others as described, for example, in *Experimental Methods in Catalytic Research*, edited by Robert B. Anderson and published by Academic Press.

The content of the phosphorus component in the impregnating solution is determined so that the atomic ratio of impregnated phosphorus to antimony in the base catalyst, P/Sb, is within the range of from 0.01:1 to 2:1, preferably from 0.03:1 to 1.5:1, more preferably from 0.05:1 to 1.0:1. If the amount of the impregnated phosphorus component is too small, sufficient catalytic activity cannot be obtained. On the other hand, if it is too large, the resulting catalyst provides a reduced yield of the desired product and, when employed as a fluidized bed catalyst, exhibits increased adhesion, resulting in a deterioration of the fluidized state, which causes a reduction in yield of the desired product.

Where the impregnated composition contains a T component or a mixture of T components as mentioned above, the atomic ratio of T to P preferably ranges from 0.001:1 to 1:1, more preferably from 0.01:1 to 0.8:1.

The impregnation of the base catalyst can be economically conducted once using a uniform solution containing a prescribed amount(s) of the prescribed component(s). If desired, impregnation with a solution having a decreased concentration may be repeated several times, each time followed by drying and, if desired, calcination. Further, a plurality of impregnating solutions differing in the components present or in the concentration of the components present may be used successively, each impregnation being followed by drying and, if desired, calcination. Impregnation in several steps is recommended where the desired impregnated amount is relatively high, or more uniform impregnation is required.

The base catalyst impregnated with the impregnating solution is then dried and calcined at a temperature of from 300° C. to 850° C. for 1 to 48 hours.

The thus prepared catalyst of the present invention satisfies both requirements of activity and strength and is suitable for use in the oxidation of organic compounds including oxidative dehydrogenation and ammoxidation.

Preferred catalysts according to the present invention are those having a composition represented by empirical formula:

$$Me_iSb_jP_kX_lQ_mR_nS_pO_q(SiO_2)_r$$

wherein Me, X, Q, R, and S are as defined above; O represents an oxygen atom; i, j, k, l, m, n, p, and q each represents the atomic ratio of the respective element for which they are subscripts, wherein i is from 5 to 15; j is from 5 to 100, preferably from 10 to 50; k is from 0.01 to 15, preferably from 0.1 to 10; l is from 0 to 15, preferably from 0.01 to 10; m is from 0 to 20, preferably from 0.05 to 15; n is from 0 to 10, preferably from 0.1 to 7; p is from 0 to 5, preferably from 0.05 to 3; r is from 10 to 200, preferably from 20 to 150; and q is the number of oxygens corresponding to the oxides formed by each of the components described above.

The catalyst according to the present invention can be employed for oxidation, oxidative dehydrogenation, or ammoxidation of organic compounds in accordance with known techniques. That is, the reaction can be carried out by passing a gaseous mixture comprising a starting organic compound, oxygen, and if necessary, ammonia through a reactor packed with the catalyst of this invention at a temperature between 200° and 600° C. The organic compounds to be used herein include hydrocarbons such as propylene, isobutylene or alkylbenzenes, alcohols such as methanol or t-butanol, isobutyric acid, etc. The reaction may be conducted either as a fluidized bed process or as a fixed bed process, with the former being preferred. These reactions may be conducted as described, for example, in U.S. Pat. Nos. 3,338,952, 3,445,521, 3,668,147, 4,461,752, and 4,511,548.

Conventional processes for preparing phosphorus-antimony-containing catalysts which comprise mixing a phosphorus component and an antimony component initially and calcining the mixture generally fail to result in catalysts having satisfactory strength. In addition, the catalysts obtained using conventional processes vary considerably in activity and strength, particularly as the calcining temperature varies and, therefore, poor reproducibility in preparation arises. On the contrary, the catalysts of the present invention exhibit satisfactory catalytic activity and strength and can be prepared with excellent reproducibility.

The present invention is illustrated in greater detail with reference to the following Examples and Comparative Examples, but it is understood that the present invention is not deemed to be limited thereto. In these examples, all the percents are by weight unless otherwise indicated.

EXAMPLE 1

A mixture of 0.44 l of nitric acid (specific gravity: 1.38) and 0.55 l of pure water was heated, and 56.5 g of an electrolytic iron powder was added thereto in small portions to prepare Solution I.

Copper nitrate weighing 88.9 g was dissolved in 0.3 l of pure water to prepare Solution II.

20.3 g of ammonium paramolybdate was dissolved in 1,659 g of silica sol ($SiO_2$: 20%) to prepare Solution III.

To Solution I were added successively Solution II, Solution III, and 335 g of an antimony trioxide powder in this order. The pH of the resulting slurry was adjusted to a pH of 2 with 15% aqueous ammonia and heated at 100° C. for 4 hours with thorough stirring. The slurry was spray dried by using a rotating disc type spray drier in a usual manner. The resulting fine spherical particles were calcined at 200° C. for 4 hours, then at 400° C. for 4 hours, and finally at 850° C. for 3 hours. There was obtained a base catalyst having the empirical formula $Cu_3Fe_3Sb_{20}Mo_1O_{59.5}(SiO_2)_{50}$.

Four hundred grams of the particulate base catalyst were impregnated with an impregnating solution prepared by diluting 26.5 g of 85% orthophosphoric acid with water and the impregnated base catalyst was dried. The above-described impregnation-drying step was repeated two additional times. Then, the particles were calcined at 800° C. for 4 hours to obtain a catalyst having the empirical formula $Cu_3Fe_9Sb_{20}Mo_1P_{12}O_{89.5}(SiO_2)_{50}$.

EXAMPLES 2 TO 8

An antimony-containing base catalyst having the empirical formula shown in Table 1 below was prepared by following the procedure of Example 1. The final calcining conditions are shown in Table 1. The resulting base catalyst particles were repeatedly impregnated with an impregnating solution containing a phosphorus component shown in Table 1, followed by drying in the same manner as in Example 1, and then the impregnated base catalyst was calcined under conditions shown in Table 1 to prepare a phosphorus-antimony-containing catalyst for oxidation.

COMPARATIVE EXAMPLE 1

A catalyst having the empirical formula $Cu_3Fe_9Sb_{20}Mo_1P_{12}O_{89.5}(SiO_2)_{50}$ (the same composition as the catalyst prepared in Example 1) was prepared in the same manner as the base catalyst of Example 1, except that 159 g of 85% orthophosphoric acid was added to the slurry before the pH adjustment and the final calcination was conducted at 800° C. for 4 hours.

EXAMPLE 9 TO 11

An antimony-containing base catalyst having the empirical formula shown in Table 1 was prepared by following the procedure of Example 1. The resulting base catalyst particles were impregnated with an impregnating solution containing a phosphorus component shown in Table 1, followed by drying in the same manner as in Example 1, and then the impregnated base catalyst was calcined under conditions shown in Table 1 to prepare a phosphorus-antimony-containing catalyst for oxidation.

COMPARATIVE EXAMPLES 2 TO 4

A catalyst having the empirical formula of $Ti_{0.5}Cu_2Fe_{11}Mo_{0.5}Sb_{20}P_2O_{66}$ (the same composition as the catalyst prepared in Example 9) was prepared in the same manner as for the base catalyst of Example 1 except that 85% orthophosphoric acid a phosphorus component was added to the slurry before the pH adjustment.

The catalytic activity and strength of each of the catalysts prepared in Examples 1 to 11 and Comparative Examples 1 to 4 were evaluated according to the following test methods, and the results obtained are shown in Table 1.

I. Activity Test:

The catalytic activity in (1) ammoxidation of methanol, (2) ammoxidation of propylene, or (3) oxidative dehydrogenation of ethylbenzene was evaluated in terms of conversion of the respective starting organic compound, yield of the desired product, and selectivity. The experimental catalytic reaction was carried out by passing the respective starting organic compound (i.e., methanol, propylene or ethylbenzene), air, and, if necessary, ammonia or an inert diluting gas, through a fluidized catalyst bed (inner diameter: 2.5 cm; height: 40 cm) of a reactor. The reaction was effected at atmospheric pressure. The molar ratio of charged reactants was as follows.

(1) Ammoxidation of Methanol:
 $O_2$ (supplied as air)/methanol=4.3:1
 $NH_3$/methanol=1.1:1
(2) Ammoxidation of Propylene:
 $O_2$ (supplied as air)/propylene=2.15:1
 $NH_3$/propylene=1.1:1
(3) Oxidative Dehydrogenation of Ethylbenzene:
 $O_2$ (supplied as air)/ethylbenzene=1.5:1
 Conversion, yield, and selectivity were calculated according to the following equations.

$$\text{Conversion (\%)} = \frac{\text{Number of Mols of Starting Compound Consumed by Reaction}}{\text{Number of Moles of Starting Compound Supplied}} \times 100$$

$$\text{Yield (\%)} = \frac{\text{Weight (g) of Carbon in Product}}{\text{Weight (g) of Carbon in Starting Compound Supplied}} \times 100$$

$$\text{Selectivity (\%)} = \frac{\text{Weight (g) of Carbon in Product}}{\text{Weight (g) of Carbon in Starting Compound Consumed by Reaction}} \times 100$$

II. Attrition Test:

An attrition test was carried out in accordance with *Test Methods for Synthetic Cracking Catalysts*, American Cyanamid Co., Ltd. 6/31-4m-1/57, known as the test method for catalysts for fluid catalytic cracking processes. The attrition loss (R) (%) can be calculated by the equation:

$$R = \frac{B}{C - A} \times 100$$

wherein A represents the weight loss (g) of catalyst due to attrition for 5 hours from the start of the test; B represents the weight loss (g) of catalyst due to attrition during the period of 5 hours to 20 hours from the start of the test; and C represents the weight (g) of catalyst tested.

The attrition test was carried out using a catalyst weight of 50 g (C=50 in the above equation). The larger the R value, the smaller the catalyst strength.

cording to the present invention exhibit improved strength and yield as compared with the comparative catalysts. In particular, it can be seen that the reproducibility in catalytic performance can be assured by the process of the present invention even if the calcining temperature is varied.

While the invention has been described in detail and with reference to specific embodiments thereof, it will be apparent to one skilled in the art that various changes and modifications can be made therein without departing from the spirit and scope thereof.

What is claimed is:

1. A phosphorus-antimony-containing catalyst for oxidation, which is obtained by
   calcining a metal oxide composition containing, as essential components,
   (a) antimony,
   (b) at least one element selected from the group consisting of iron, cobalt, nickel, tin, uranium, chromium, copper, manganese, titanium, thorium, and cerium, and
   (c) silica
   at a temperature ranging from 500° C. to 950° C. to prepare a base catalyst,
   impregnating the base catalyst with a solution con-

TABLE 1

| Example No. | Base Catalyst Composition (Atomic Ratio) | Calcining Condition | Impregnation Composition (Atomic Ratio) | Calcining Condition | Activity Test Condition | Reaction Temperature (°C.) | Contact Time (sec) | Yield | Conversion | Selectivity | R value |
|---|---|---|---|---|---|---|---|---|---|---|---|
| Example 1 | $Cu_3Fe_9Sb_{20}Mo_1O_{59.5}(SiO_2)_{50}$ | 850° C. 3 hrs | $P_{12}O_{30}$ | 800° C. 4 hrs | (1) | 430 | 1.5 | HCN 85.1% | methanol 98.2% | HCN 86.7% | 0.4 |
| Example 2 | $Ce_{1.5}Fe_6Sb_{25}Mo_{0.5}W_{0.3}Pb_{0.3}O_{38.7}(SiO_2)_{30}$ | 780° C. 4 hrs | $P_5O_{12.5}$ | 700° C. 3 hrs | (1) | 400 | 2.0 | HCN 88.2% | methanol 95.2% | HCN 92.6% | 0.3 |
| Example 3 | $Sn_{10}Sb_{35}Al_3Tl_{0.3}O_{94.95}(SiO_2)_{90}$ | 800° C. 3 hrs | $P_{10}O_{25.0}$ | 750° C. 3 hrs | (2) | 470 | 4.5 | AN 73.5% | propylene 93.8% | AN 78.4% | 2.1 |
| Example 4 | $Mn_{1.5}Cr_{1.0}Fe_{7.5}Sb_{30}V_{0.1}Zr_{10}Cs_{0.1}O_{94.55}(SiO_2)_{100}$ | 800° C. 3 hrs | $P_{35}O_{87.5}$ | 730° C. 3 hrs | (3) | 480 | 2.5 | styrene 54.3% | ethylbenzene 70.1% | styrene 77.5% | 1.2 |
| Example 5 | $Cu_3Fe_{10}Sb_{20}Mo_{0.8}V_{0.1}Te_{1.6}O_{63.85}(SiO_2)_{50}$ | 720° C. 4 hrs | $P_{16}O_{40}$ | 650° C. 3 hrs | (1) | 410 | 2.0 | HCN 89.5% | methanol 98.0% | HCN 91.3% | 0.6 |
| Example 6 | $U_1Ni_1Fe_{10}Sb_{25}Mo_2Mg_3Li_{0.1}O_{77.72}(SiO_2)_{140}$ | 800° C. 3 hrs | $P_2O_{5.0}$ | 700° C. 3 hrs | (1) | 390 | 2.0 | HCN 86.7% | methanol 97.7% | HCN 88.7% | 0.8 |
| Example 7 | $Co_1Fe_{13}Sb_{40}Mo_9Zn_2Bi_3P_1B_1K_{0.2}O_{138.1}(SiO_2)_{100}$ | 680° C. 3 hrs | $P_4O_{10.0}$ | 600° C. 3 hrs | (1) | 410 | 1.5 | HCN 85.8% | methanol 97.3% | HCN 88.2% | 0.3 |
| Example 8 | $Cu_{2.5}Fe_{10}Sb_{20}W_{0.4}Te_{0.8}O_{60.3}(SiO_2)_{50}$ | 800° C. 3 hrs | $P_{0.8}Mo_{0.2}O_{2.6}$ | 700° C. 3 hrs | (2) | 460 | 5.0 | AN 74.0% | propylene 99.0% | AN 74.8% | 0.2 |
| Example 9 | $Ti_{0.5}Cu_2Fe_{11}Mo_{0.5}Sb_{20}O_{61}(SiO_2)_{50}$ | 800° C. 3 hrs | $P_2O_5$ | 600° C. 3 hrs | (1) | 420 | 2.0 | HCN 86.1% | methanol 99.1% | HCN 86.9% | 0.5 |
| Example 10 | $Ti_{0.5}Cu_2Fe_{11}Mo_{0.5}Sb_{20}O_{61}(SiO_2)_{50}$ | 800° C. 3 hrs | $P_2O_5$ | 700° C. 3 hrs | (1) | 430 | 2.0 | HCN 85.7% | methanol 98.6% | HCN 86.9% | 0.7 |
| Example 11 | $Ti_{0.5}Cu_2Fe_{11}Mo_{0.5}Sb_{20}O_{61}(SiO_2)_{50}$ | 800° C. 3 hrs | $P_2O_5$ | 780° C. 3 hrs | (1) | 430 | 2.0 | HCN 85.5% | methanol 98.6% | HCN 86.7% | 0.5 |
| Comparative Example 1 | $Cu_3Fe_9Sb_{20}Mo_1P_{12}O_{89.5}(SiO_2)_{50}$ | 800° C. 4 hrs | — | — | (1) | 450 | 2.0 | HCN 82.5% | methanol 95.3% | HCN 86.6% | 3.9 |
| Comparative Example 2 | $Ti_{0.5}Cu_2Fe_{11}Mo_{0.5}Sb_{20}P_2O_{66}(SiO_2)_{50}$ | 700° C. 3 hrs | — | — | (1) | 420 | 1.5 | HCN 79.7% | methanol 99.3% | HCN 80.3% | 4.2 |
| Comparative Example 3 | $Ti_{0.5}Cu_2Fe_{11}Mo_{0.5}Sb_{20}P_2O_{66}(SiO_2)_{50}$ | 750° C. 3 hrs | — | — | (1) | 410 | 2.0 | HCN 84.1% | methanol 97.7% | HCN 86.1% | 3.6 |
| Comparative Example 4 | $Ti_{0.5}Cu_2Fe_{11}Mo_{0.5}Sb_{20}P_2O_{66}(SiO_2)_{50}$ | 760° C. 3 hrs | — | — | (1) | 430 | 2.0 | HCN 81.3% | methanol 96.0% | HCN 84.7% | 5.9 |

On comparing the catalysts of Example 1 and Comparative Example 1, which have the same composition, it can be seen that the catalyst of the present invention achieves a satisfactory yield and, in particular, exhibits markedly improved strength.

On comparing the catalysts of Examples 9 to 11 and Comparative Examples 2 to 4, which have the same composition, it is apparent that all of the catalysts actaining a phosphorus compound so that the atomic ratio of impregnated phosphorus to antimony in the base catalyst is within the range of from 0.01:1 to 2:1,
drying the impregnated base catalyst, and calcining the dried product at a temperature ranging from 300° C. to 850° C.

2. The phosphorus-antimony-containing catalyst as claimed in claim 1, wherein said metal oxide composition is obtained by adjusting a slurry containing said components (a), (b), and (c) to a pH of 7 or less, heat treating the slurry at a temperature of 40° C. or more, and spray drying the slurry.

3. The phosphorus-antimony-containing catalyst as claimed in claim 1, wherein said base catalyst has a composition represented by empirical formula:

$$Me_a Sb_b X_c Q_d R_e S_f O_g (SiO_2)_h$$

wherein
Me represents at least one element selected from the group consisting of Fe, Co, Ni, Sn, U, Cr, Cu, Mn, Ti, Th, and Ce;
X represents at least one element selected from the group consisting of V, Mo, and W;
Q represents at least one element selected from the group consisting of Be, Mg, Ca, Sr, Ba, Y, La, Zr, Hf, Nb, Ta, Re, Ru, Os, Rh, Ir, Pd, Pt, Ag, Zn, Cd, Al, Ga, In, Ge, and Pb;
R represents at least one element selected from the group consisting of B, P, Te, Bi, As, and Se;
S represents at least one element selected from Li, Na, K, Rb, Cs, and Tl;
O represents an oxygen atom; and
a, b, c, d, e, f, g, and h each represents the atomic ratio of the respective element for which each is a subscript, wherein
a is from 5 to 15;
b is from 5 to 100;
c is from 0 to 15;
d is from 0 to 20;
e is from 0 to 10;
f is from 0 to 5;
h is from 10 to 200; and
g is the number oxygens corresponding to the oxides formed by each of the components described above; provided that the P/Sb atomic ratio is 0.2:1 or less.

4. The phosphorus-antimony-containing catalyst as claimed in claim 3, wherein
Me represents at least one element selected from the group consisting of Fe, Co, Ni, Sn, Cr, Cu, Mn, Ti, and Ce;
Q represents at least one element selected from the group consisting of Mg, Zr, Nb, Ta, Ag, Zn, Al, and Pb;
R represents at least one element selected from the group consisting of B, P, Te, and Bi;
S represents at least one element selected from the group consisting of Li, Na, and K;
b is from 10 to 50;
c is from 0.01 to 10;
d is from 0.05 to 15;
e is from 0.1 to 7;
f is from 0.05 to 3; and
h is from 20 to 150.

5. The phosphorus-antimony-containing catalyst as claimed in claim 1, wherein said phosphorus compound is at least one phosphorus compound selected from the group consisting of orthophosphoric acid, an orthophosphate, pyrophosphoric acid, a pyrophosphate, tripolyphosphoric acid, a tripolyphosphate, metaphosphoric acid, a metaphosphate, a peroxomono- or diphosphoric acid, a peroxophosphate, phosphorous acid, and a phosphite.

6. The phosphorus-antimony-containing catalyst as claimed in claim 1, wherein said catalyst has a composition represented by empirical formula:

$$Me_i Sb_j P_k X_l Q_m R_n S_p O_q (SiO_2)_r$$

wherein
Me represents at least one element selected from the group consisting of Fe, Co, Ni, Sn, U, Cr, Cu, Mn, Ti, Th, and Ce;
X represents at least one element selected from the group consisting of V, Mo, and W;
Q represents at least one element selected from the group consisting of Be, Mg, Ca, Sr, Ba, Y, La, Zr, Hf, Nb, Ta, Re, Ru, Os, Rh, Ir, Pd, Pt, Ag, Zn, Cd, Al, Ga, In, Ge, and Pb;
R represents at least one element selected from the group consisting of B, P, Te, Bi, As, and Se;
S represents at least one element selected from Li, Na, K, Rb, Cs, and Tl;
O represents an oxygen atom;
i, j, k, l, m, n, p, and q each represents the atomic ratio of the respective element for which each is a subscripts, wherein
i is from 5 to 15;
j is from 5 to 100;
k is from 0.01 to 15;
l is from 0 to 15;
m is from 0 to 20;
n is from 0 to 10;
p is from 0 to 5;
r is from 10 to 200; and
q is the number of oxygens corresponding to the oxides formed by each of the components described above.

7. The phosphorus-antimony-containing catalyst as claimed in claim 6, wherein
j is from 10 to 50;
k is from 0.1 to 10;
l is from 0.01 to 10;
m is from 0.05 to 15;
n is from 0.1 to 7;
p is from 0.05 to 3; and
r is from 20 to 150.

* * * * *